United States Patent [19]

Horn et al.

[11] 3,852,716

[45] Dec. 3, 1974

[54] POINT-OF-SALE PROCESSING SYSTEM

[75] Inventors: Jerry A. Horn, Longwood; Kermit L. Sawer, Altamonte Springs, both of Fla.

[73] Assignee: Staid, Inc., Sanford, Fla.

[22] Filed: Mar. 2, 1973

[21] Appl. No.: 337,447

[52] U.S. Cl. .......................... 340/172.5, 235/61 PE

[51] Int. Cl. ............................................. G06f 9/02

[58] Field of Search..... 340/172.5; 235/61 R, 61 PE

[56] References Cited

UNITED STATES PATENTS

| | | | |
|---|---|---|---|
| 2,793,806 | 5/1957 | Lindesmith | 340/172.5 |
| 2,850,719 | 9/1958 | Manna | 340/172.5 |
| 2,923,469 | 2/1960 | Woodbury | 340/172.5 |
| 2,987,704 | 6/1961 | Gimpel et al. | 340/172.5 |
| 3,000,555 | 9/1961 | Innes | 340/172.5 |
| 3,144,549 | 8/1964 | Hoberg et al. | 340/172.5 |
| 3,223,979 | 12/1965 | Dirks | 340/172.5 |

*Primary Examiner*—Gareth D. Shaw
*Assistant Examiner*—Mark Edward Nusbaum
*Attorney, Agent, or Firm*—Duckworth, Hobby & Allen

[57] ABSTRACT

A data processing system comprising a keyboard having a plurality of keys arranged in an array of rows and columns, and programming means likewise arranged in an array of rows and columns such that each intersection of a row and a column corresponds to a single key at a row-column intersection of the keyboard. Means are included for electrically scanning one of the keyboard rows and columns to sequentially detect activated keys, and means are included for latching the scanning means until an output is provided which corresponds to the activated key.

12 Claims, 9 Drawing Figures

PATENTED DEC 3 1974 3,852,716

SHEET 3 OF 3

POINT-OF-SALE PROCESSING SYSTEM

BACKGROUND OF THE INVENTION

1. Field of the Invention

The present invention relates to data processing systems and apparatus, and in particular, relates to such systems which are designed to operate at the point of sale.

2. Description of the Prior Art

Various point-of-sale data processing systems have been developed in the past. Generally, these systems are designed to provide inventory control simultaneously with the computation of a customer total and the preparation of a receipt. In one such system, primarily designed for use in supermarkets, each item has a coded tape or other means thereon. When all of the items are passed through a reader, the codes are "read" to determine the item price and the desired inputs for inventory control. The use of this system is limited, since the coded means cannot be applied to all goods, for example, food served in a cafeteria line.

In such point-of-sale systems, it is extremely desirable to provide price programming means at the operator terminal in order that unit pricing can be changed as dictated by corresponding changes in the product line. This feature is desirable for at least two reasons. First, it may be necessary to make such changes frequently and in an expeditious manner. Second, from a "human engineering" viewpoint, this allows the operator to be familiar with the various goods in the product line and the unit prices.

Also from a "human engineering" standpoint, it is desirable to arrange the programming component in a manner which physically corresponds in some fashion with the operator's keyboard such that the operator can easily correlate a given program with the associated key on the keyboard.

In the prior art, such price programmers have variously consisted of wiring patch panels and other techniques which allow unit pricing to be altered. While providing for rapid unit price changes, such price programmers are deficient with respect to the "human engineering" factors discussed above. See for example U.S. Pat. Nos. 3,000,555 to Innes and 3,144,549 to Hoberg et al. Both of these references teach digital data processing systems having a central processor, a keyboard, programable peg boards, and scanning means responsive to keyboard operation for addressing a program or to determine a given program variation.

SUMMARY OF THE INVENTION

The present invention comprises a data processing system comprising signal processing means, and a keyboard having a plurality of keys arranged in an array of rows and columns with the keyboard being electrically coupled to the processing means and adapted to provide an electrical input thereto corresponding to an activated key. The system further includes programming means electrically coupled to the processor, and arranged in an array of rows and columns such that each intersection of a row and a column corresponds to a single key at a row-column intersection of the keyboard. Means are also included for electrically scanning one of the keyboard rows and columns to sequentially detect activated keys, and means are included for latching the scanning means until an output is provided corresponding to the activated key.

THE DRAWING

Figure 4:
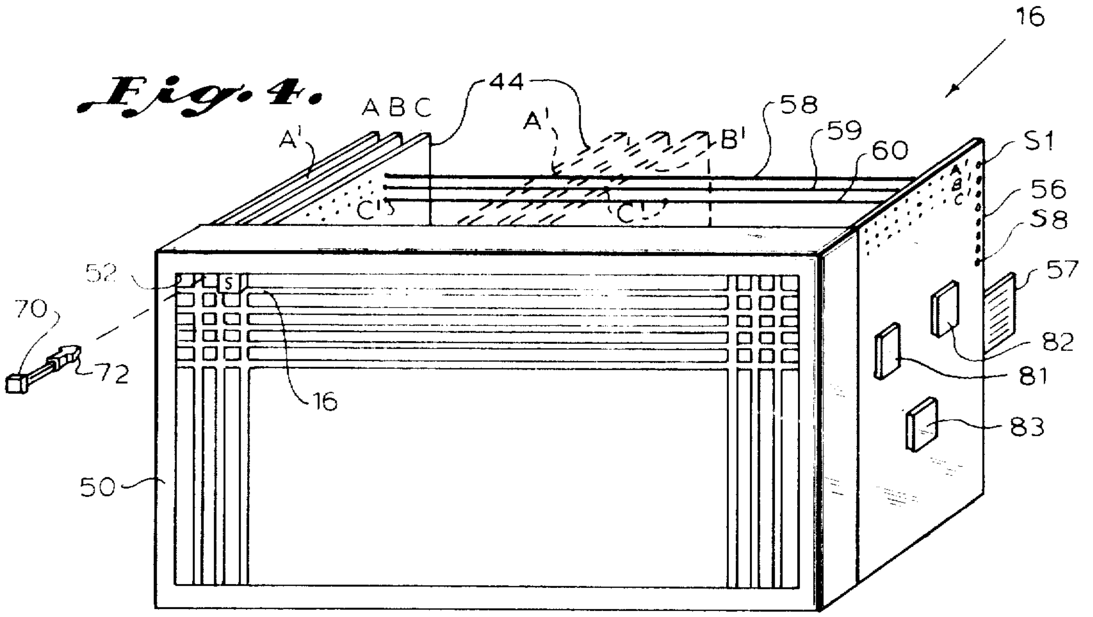
FIG. 4 is a perspective view of an embodiment of the price programmer identified in the system of FIG. 1.
Figure 5:
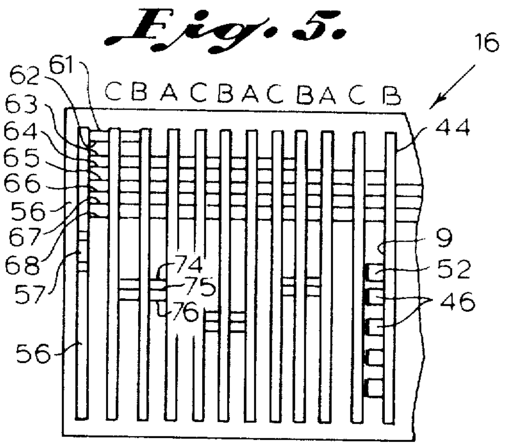
FIG. 5 is a side view of the price programmer of FIG. 4.
Figure 6A:
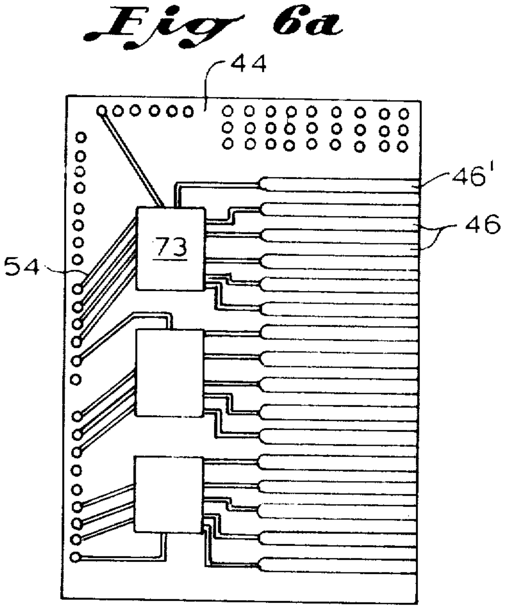
Figure 6B:
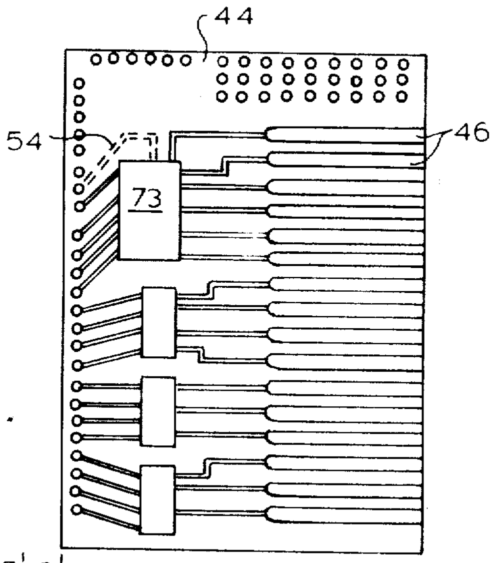
Figure 6C:
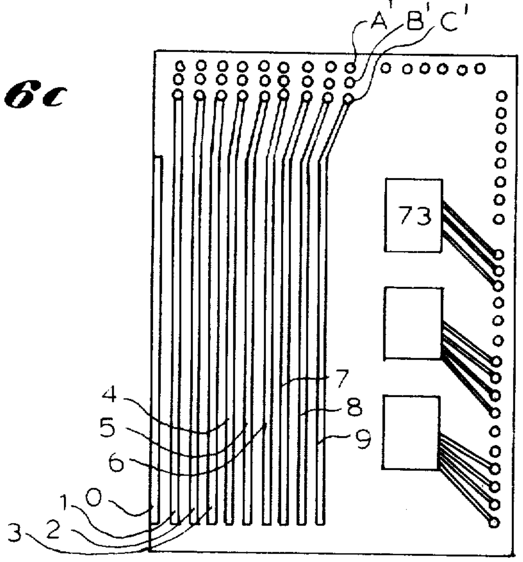

FIGS. 6(a), 6(b) and 6(c) are top plan views of printed circuit boards employed in the price programmer illustrated in FIGS. 4 and 5.

DETAILED DESCRIPTION

Figure 1:
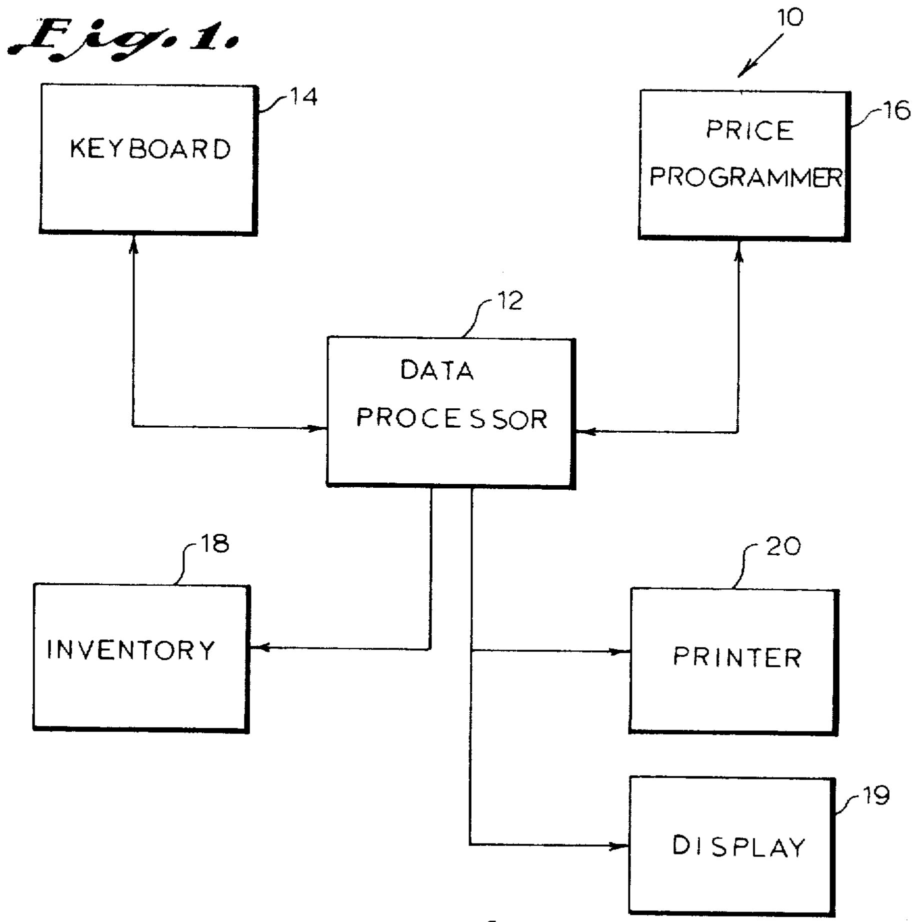
FIG. 1 is a block diagram illustrating the various components of the system of the present invention.

An embodiment of the system of the present invention is shown in FIG. 1. The system, referred to generally as 10, includes a data processor 12 capable of various processing functions, such as memory, addition, multiplication, control, etc., which functions are well known to those skilled in the art. Coupled with the data processor 12 is a keyboard 14 and a price programmer 16, both of which receive inputs from the data processor 12 as well as providing outputs thereto. The keyboard 14 is hereinafter described in greater detail with reference to FIGS. 2 and 3, and the price programmer 16 is described in detail with reference to FIGS. 4, 5 and 6. Also coupled with the data processor 12 is an inventory control system 18, which may comprise a central data processor coupled to a number of data processors 12. A visual display 19, such as a gas discharge arrangement, and a paper tape printer 20 are likewise coupled to the data processor 12.

Figure 2:
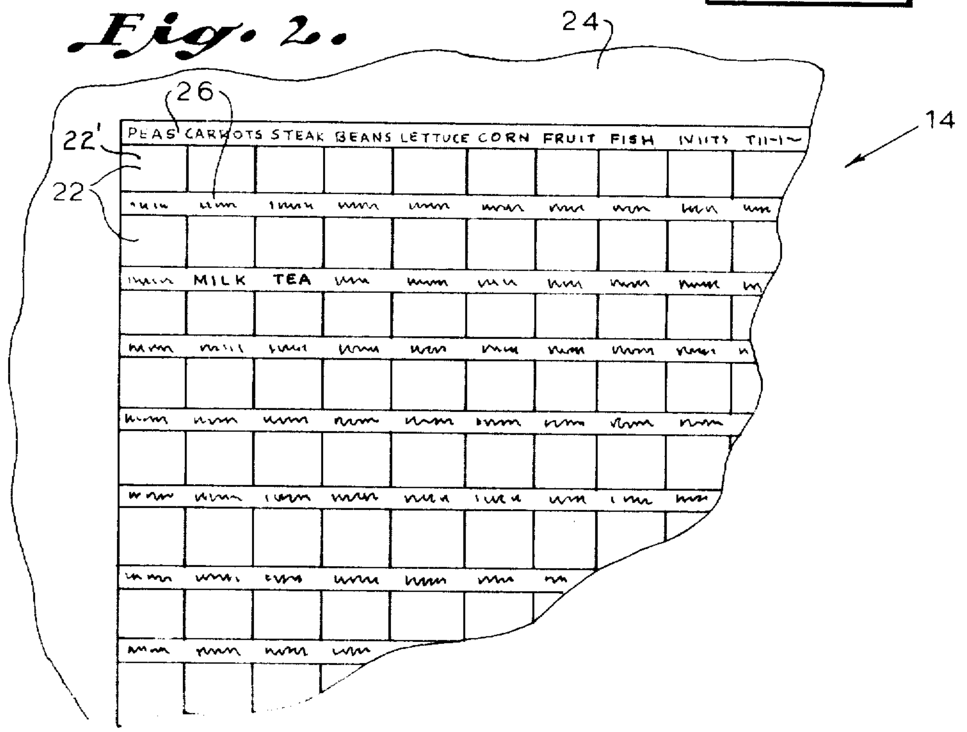
FIG. 2 is a top plan view, partially cut away, of an embodiment of the keyboard identified in the system of FIG. 1.

Noting FIG. 2, the keyboard 14 comprises a plurality of keys 22 arranged in an X–Y array of rows and columns and mounted on a chassis 24. The keyboard 14 may include an identification strip 26 for identifying the goods corresponding to each key 22.

Figure 3:
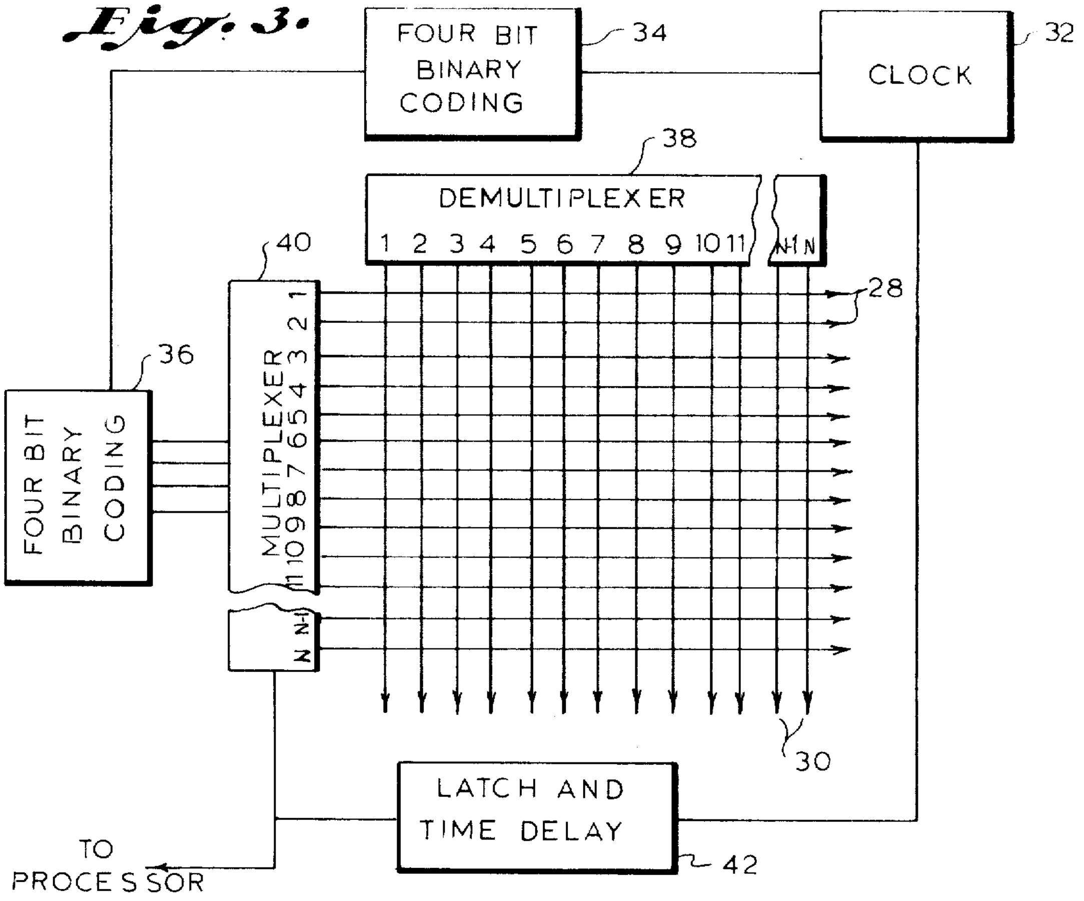
FIG. 3 is a block diagram of a circuit arrangement employed with the keyboard of FIG. 2.

Referring to FIG. 3, the keyboard 14 includes a plurality of column circuit lines 28 arranged as the row of keys 22 of FIG. 2, each column circuit line 28 being electrically coupled to all of the keys 22 in the corresponding column. Likewise, a plurality of row circuit lines 30 are coupled to all of the keys 22 in the corresponding row. While the keys 22 may comprise any of a variety of make-break devices, preferably the keys comprise a pressure-activated switch which will "make" a connection between the row and column circuit lines 30, 28 to which it is connected, as shown at the seventh row-sixth column intersection of FIG. 3.

The keyboard 14 also comprises scanning means which, in this embodiment, comprises a standard clock circuit 32. The scanning output of the clock circuit 32 is fed into one four-bit binary coding circuit 34, which is coupled through a demultiplexing circuit 38 to all of the row circuit lines 30. A second binary coding circuit 36 is coupled through a multiplexing circuit 40 to all of the column circuit lines 28 and is clocked by circuit 34. The output of the multiplexing circuit is coupled to the data processor 12, and through a latch and time delay circuit 42 to the clock circuit 32.

The circuit of FIG. 3 operates in the following manner. The clock circuit 32 continuously provides a scanning pulse into the binary coding circuit 34, and subsequently to circuit 36, causing each coding circuit to sequentially generate a four-bit binary code or "word" each of which corresponds to one of the row or column intersections of the respective circuit lines 30 or 28.

When a key 22 is activated, a circuit path is established between the corresponding row and column circuit line 30 and 28. When a scanning pulse is detected in this circuit path, an output is fed out of the multiplexing circuit 40 and into the processor 12 together with the four-bit words being generated at that particular time. Simultaneously, the latching and time delay circuit 42 detects this output, and latches the clock circuit 32 during the period of the output, and for a time determined by the time delay circuit associated therewith. This time delay period prevents another output from the same key which might be caused by transients, or switch "bounce". The manner in which the output of the keyboard 14 is correlated with the price programmer 16 will be hereinafter described. While a variety of digital circuit components may be employed for the processor 12, the multiplexing and demultiplexing circuits 38 and 40, the latching and time delay circuit 42, the binary coding circuits 34 and 36 and the clock circuit 32, component identities for digital integrated circuit devices used in a specific embodiment of the present invention are set forth in the attached appendix.

These devices set forth in the appendix which are manufactured by Texas Instruments are described in detail in the Texas Instruments Catalog CC-401, First Edition (1971). Design applications of these circuits is set out in the manual "Designing with TTL Integrated Circuits" prepared by the Texas Instruments Components Group and edited by Morris and Miller, published by McGraw-Hill Publishing Co., Hightstown, N. J., 1971. The specific electrical characteristics of the Intel 4004 device is set forth in the Intel Multi-Sheet 7144, November, 1971, and in the Intel Catalog MCS-4, entitled "Micro Computer Set Users Manual", July, 1972, Revision 3.

Noting FIG. 4 the price programmer 16 comprises a plurality of printed circuit boards 44, examples of which are shown in FIGS. 6(*a*)–(*c*). With reference to FIGS. 6(*a*)–(*c*), each printed circuit board 44 includes a plurality of row conductive paths 46 disposed along one side thereof, each conductive path being coupled with associated electronics by other conductive paths (shown but not numbered). In addition, as shown in FIG. 6(*c*), each printed circuit board 44 includes on the side opposite of the one side, ten row conductive paths which are identified as 0–9, respectively, in FIG. 6(*c*).

Referring again to FIG. 4, the price programmer 16 includes a frame member 50 having a plurality of equidistantly spaced openings 52 arranged in an array of rows and columns, with each opening being axially aligned with the corresponding row conductive path 46 on the printed circuit board 44 proximate thereto (the relationship of the openings 52 and the row conductive paths 46 is clearly shown in the side view of FIG. 5). Each opening 52 is adapted to receive a plug 70 having a metal clip 72 on the extremity thereof. The length of the plug 70 is one of ten lengths, each graduated equal to the distance from the periphery of the opening to one of the ten column conductive paths 0–9 on the reverse side of the printed circuit board 44 associated with that opening. Preferably each plus 70 also has a numeral printed thereon corresponding to the column conductive path 0–9 which it is adapted to contact; i.e., the plug 70 in FIG. 4 contacts the column conductive path 4 when inserted in the opening 52.

The printed circuit boards 44 are arranged in the price programmer 16 in three-board groups, each of which comprises a major column. As shown in FIGS. 4 and 5, the three circuit boards 44 in each group are identified as A, B and C, respectively. The differences between the boards A, B and C are noted with reference to FIGS. 6(*a*) through (*c*), in which FIG. 6(*a*) comprises one side of Board A, FIG. 6(*b*) comprises the front side of Board B, and FIG. 6(*c*) comprises the reverse side of Board C. Noting FIG. 6(*c*), all three of the boards A, B and C include three apertures A', B' and C' at the upper termination of each column conductive path 1 through 9. These apertures A', B', C' are metalized and are only electrically contacted with a respective column conductive 1 through 9 depending on which board A, B or C configuration is being utilized. For example, the uppermost aperture A' is conductive with the respective column conductive paths 1 through 9 in a board A configuration; the center aperture B' for Board B, and the lower aperture C' for board C. Further, board B, as shown in FIG. 6(*b*), includes conductive path interconnections between the associated electronics such as a multiplexing circuit 73 and one of eight strobe terminals S 1 – S 8 on the left leading edge of the board B. One of these conductive paths is identified by element 54 in FIG. 6(*b*).

As shown in FIG. 4, the price programmer 16 further includes a signal processing card 56 including an input jack 57 adapted to receive electrical inputs from the data processor 12. A plurality of bus bars, including three bars 58, 59 and 60 each extend through all of either apertures A', B' or C' connected to the corresponding column conductive path 9 of each printed circuit board. Since, as discussed above, only the apertures A' of circuit boards A are electrically continuous with the column conductive path 9, then bus bar 58 makes electrical contact only with those column conductive paths 9 located on the reverse side of each circuit board A. Likewise, bus bar 59 only makes electrical contact with the column conductive path 9 of the circuit board B, and bus bar 60 to the column conductive path 9 of boards C. It will be understood that, while not shown, other bus bars make similar connections to column conductive paths 1 through 8 of each printed circuit board A, B and C.

Now note FIG. 5, which illustrates eight strobe bars 61–68 consecutively connected to the strobe terminals S 1 – S 8 of circuit boards B 1 – B 8. These strobe bars 61 – 68 also extend through corresponding terminal openings S 1 – S 8 of the boards A and C, but only interconnect with the electronics on the boards B, due to the conductive path 54 as discussed above.

The price programmer 16 functions in the following manner. Initially the price programmer 16 is addressed from the processor 12 with a binary coding corresponding to an activated key 22 on the keyboard 14. This coding is received at the input jack 57 and processed through the associated electronics. Depending upon the row - column coding of the input, that input is bussed along one of the strobe bars S 1 – S 8 to the corresponding "B" circuit board B 1 – B 8. For example, if the key 22′ in the first row, either column of the keyboard of FIG. 2 is activated, the binary code is bussed down strobe bar S 8 to circuit board B 8. This coding is then carried by conductive path 54 to a demultiplexing circuit 73 (note FIG. 6(*b*)). The demultiplexed coding is then bussed to the associated A and C circuit boards via bus lines 74, 75 and 76 in order to simultaneously energize all three circuit boards A, B and C in that major column. It is understood that each of the other major column grouping of three circuit boards is likewise energized by corresponding bus lines. The demultiplexing circuit 73 on each circuit board A, B and C selectively energizes only the row conductive path 46 corresponding to the row of the depress key 22′ of the keyboard 14, which in the present example, constitutes the uppermost row conductive path 46′ of each circuit board A, B and C. Depending upon the length of the plug 70 and the corresponding openings 52, the row conductive path 46′ makes electrical contact with one of the column conductive paths 0–9 on the back side of the next adjacent circuit board. The corresponding binary coding is then returned down the bus bars 58, 59 and 60 to the signal processing card 56. The processing card 56 includes three multiplexing circuits 81–83, each coupled to one of the bus bars 58, 59 and 60 (and thus to a corresponding circuit board A, B or C). Further, each multiplexing circuit 81–83 is likewise coupled to the other column conductive paths 1 through 8 for all of the corresponding circuit boards A, B or C, although the remaining bus bars associated therewith are omitted in FIG. 4 for clarity.

By means of this interconnection scheme, the program for each key 22 may be determined. By way of example, two plugs 70 are shown installed in FIG. 4 in the openings 52 corresponding to the circuit boards B and C of the first row - first column key 22′ in FIG. 2. In FIG. 4, the B board plus comprises a "four" plug, and the C board plug comprises a "five" plug. As described above, both plugs thus make connection to the row conductive path 46′ of boards B and C, while the "four" plug contacts only the fourth conductive path 4, etc. The absence of a plug, or a "zero" plus, maintains an open circuit (note in FIG. 6(*c*), since the column conductive path "zero" is open circuited with respect to the apertures A′, B′ and C′).

In this way the corresponding price program of dollars (A board), dimes (B board) and pennies (C board) are bussed to the signal processing cards 56, where an output is sent to the processor 12 corresponding to the price program for the addressed row-column intersection of the price programmer 16. General reference has been made above to "associated electronics," since the signal processing circuits employed may comprise a variety of multiplexing, demultiplexing and binary processing circuits which do not constitute a part of this invention.

The versatility of the bussing scheme and the circuit board design of the price programmer 16 is further described with reference to FIG. 7, which illustrates an exploded view of one major column of the price programmer in FIG. 4 as employed to program alternative tax-determining schemes.

Figure 7:
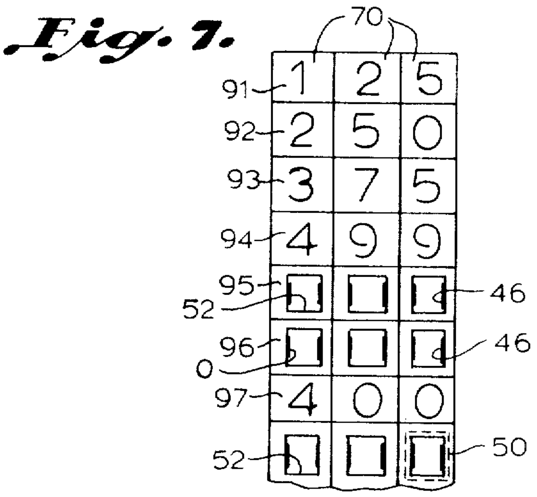

Noting FIG. 7, a major column 70 of the price programmer 16 includes at least six rows 91–96 which may be employed to program State sales tax brackets. Another, seventh row 97 is employed to program the given tax rate. For example, assuming a state sales tax of four per cent is to be levied on the purchase, the seventh row 97 is addressed to read out the programmed tax rate for integral dollar amounts. Further, assume that this sales tax scheme includes four brackets: 0–25 cents, 26 – 50 cents, 51 – 74 cents, and 75 – 99 cents, with corresponding taxes of 1, 2, 3 and 4 cents, respectively, for the four brackets. Simultaneously, the four top rows 91–94 are addressed to determine the programmed brackets. As shown in FIG. 7, the last two plugs 70 of each row 91–94 represent a bracket, while the first plug 70 indicates the tax for that bracket. If any amount between integral dollar amounts is totalled, the processor 12 simply detects the corresponding bracket and adds the tax for that bracket. This dollar-rate, change-bracket method has heretofore customarily been determined mentally by the operator. The price programmer 16 is made more versatile by programming the processor 12 to determine a straight-rate tax. This may be programmed by the insertion of a plug 70 in the last aperture 52 in an eighth row 98 (note dotted line), such that the tax on the total is then determined on a straight rate, or percentage, basis set forth in row 97.

Appendix

| | |
|---|---|
| Coder | Texas Instruments SN 74161 |
| Clock | Texas Instruments SN 7413 |
| Multiplexers | Texas Instruments SN 74151 |
| De-multiplexers | Texas Instruments SN 74154 |
| Latch Circuit | Texas Instruments SN 7474 |
| Data Processor | Intel 4004 |

We claim:

1. A data processing system comprising:

a. data processing means;

b. a keyboard having a plurality of keys arranged in an array of rows and columns, said keyboard being electrically coupled to said processing means and adapted to provide an electrical input thereto corresponding to one of said keys when such key is activated.

c. programming means electrically coupled to said processing means, said programming means including a plurality of substantially parallel printed circuit boards each having a plurality of individual conductive paths disposed on the front and back sides thereof, the conductive paths on one side being substantially transverse to the conductive paths on the opposing side; and wherein said conductive paths on said printed circuit boards define a row-column array such that each row-column intersection has a physical relationship which corresponds to a single key at a row-column intersection on said keyboard;

d. means for electrically scanning either of said keyboard rows and columns to sequentially detect activated keys and provide said input corresponding to each detected key; and e. means for latching said scanning means until an output is provided from said keyboard into said processing means.

2. A system as recited in claim 1 wherein said keyboard comprises:

a. a plurality of circuit lines arranged in said row-column array, each circuit line connected to all of said keys in the corresponding row or column; and b. coding means coupled with said scanning means for simultaneously generating a predetermined code when each rowcolumn intersection of said circuit lines is scanned.

3. A system as recited in claim 2 wherein said coding means comprises a binary coding circuit coupled to said scanning means and said row or column circuit lines.

4. A system as recited in claim 3 wherein said scanning means comprises a clock circuit coupled to said binary coding circuit.

5. A system as recited in claim 4 further comprising another binary coding circuit coupled to the other of said row and column circuit lines.

6. A system as recited in claim 5 further comprising a demultiplexing circuit interposed between one of said binary coding circuits and the corresponding row and column circuit lines, and a multiplexing circuit coupled between the other binary coding circuit and the corresponding row and column circuit lines.

7. A system as recited in claim 6 wherein said latching means comprises a latching circuit interposed between said multiplexing circuit and said clock circuit, said latching circuit adapted to latch said clock circuit when an output is received from said multiplexing circuit.

8. A system as recited in claim 1 wherein said programmer further comprises:

a. a frame member having a plurality of equidistantly spaced openings arranged in an array of rows and columns; and wherein b. each said opening is axially aligned with a corresponding one of said conductive paths on said one side.

9. A system as recited in claim 1 further comprising;

said printed circuit boards arranged in three-board major columns;

one of said boards in each said major column comprising means for receiving an input from said processing means corresponding to a row in said major column;

means coupled with said one board for energizing said corresponding row on all of said boards in said major column; and means for conducting current from said energized row to one of said transverse columns on one of said boards adjacent thereto.

10. A system as recited in claim 9 wherein said current-conducting means comprises a removable plug extending through said aperture and including a metallic clip for electrically coupling said energized row to said transverse column.

11. A system as recited in claim 10 further comprising bus lines coupled between each transverse column and said processing means.

12. A system as recited in claim 11 wherein said bus lines comprise three bus lines, each bus line being only coupled to said transverse column of a corresponding one of said three circuit boards in each major column.

* * * * *